Sept. 25, 1951 — F. K. DANIEL — 2,568,990
DIALYSIS PROCEDURE
Filed Oct. 2, 1947 — 2 Sheets-Sheet 1
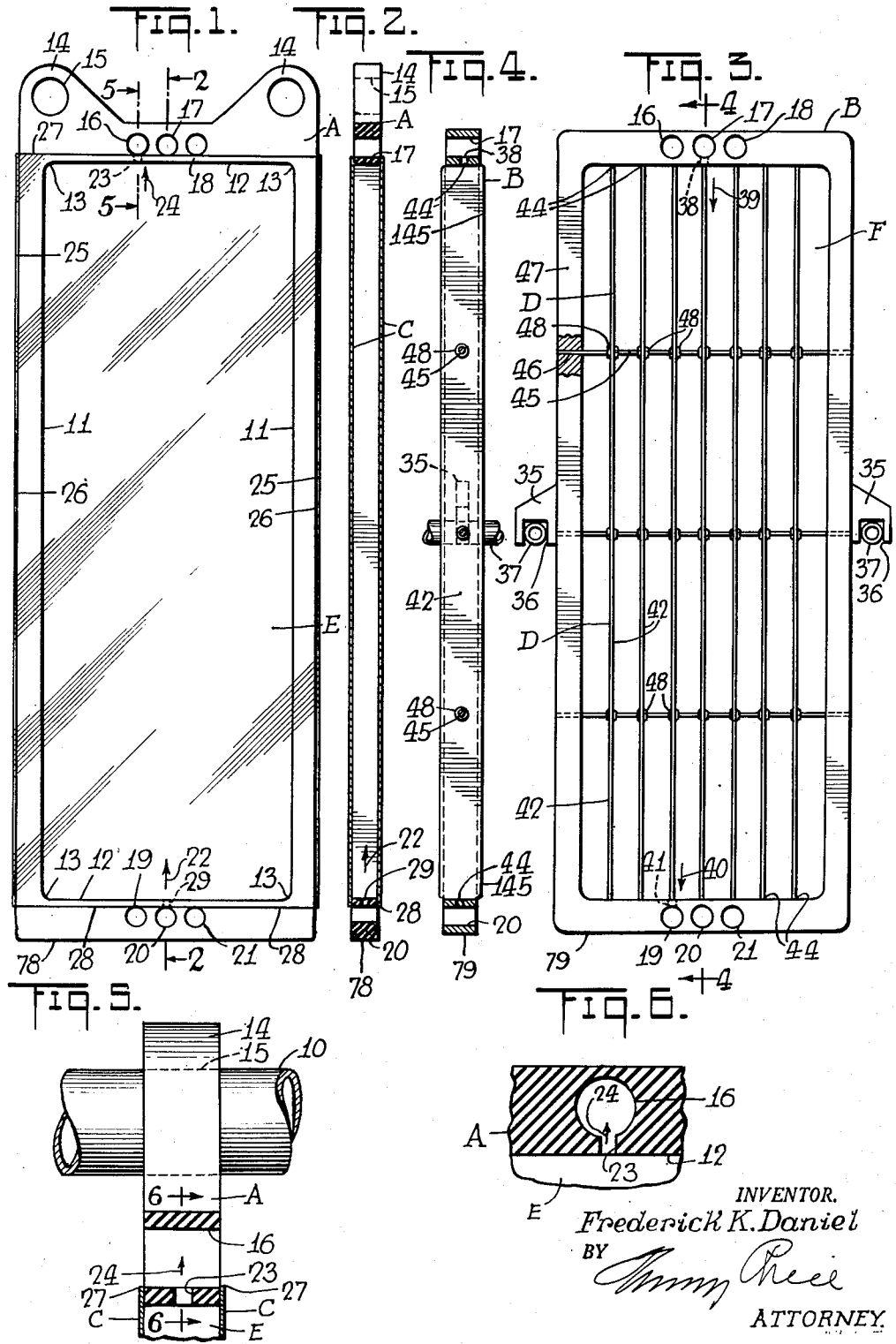
INVENTOR.
Frederick K. Daniel
BY
ATTORNEY Sept. 25, 1951  F. K. DANIEL  2,568,990
DIALYSIS PROCEDURE
Filed Oct. 2, 1947  2 Sheets-Sheet 2
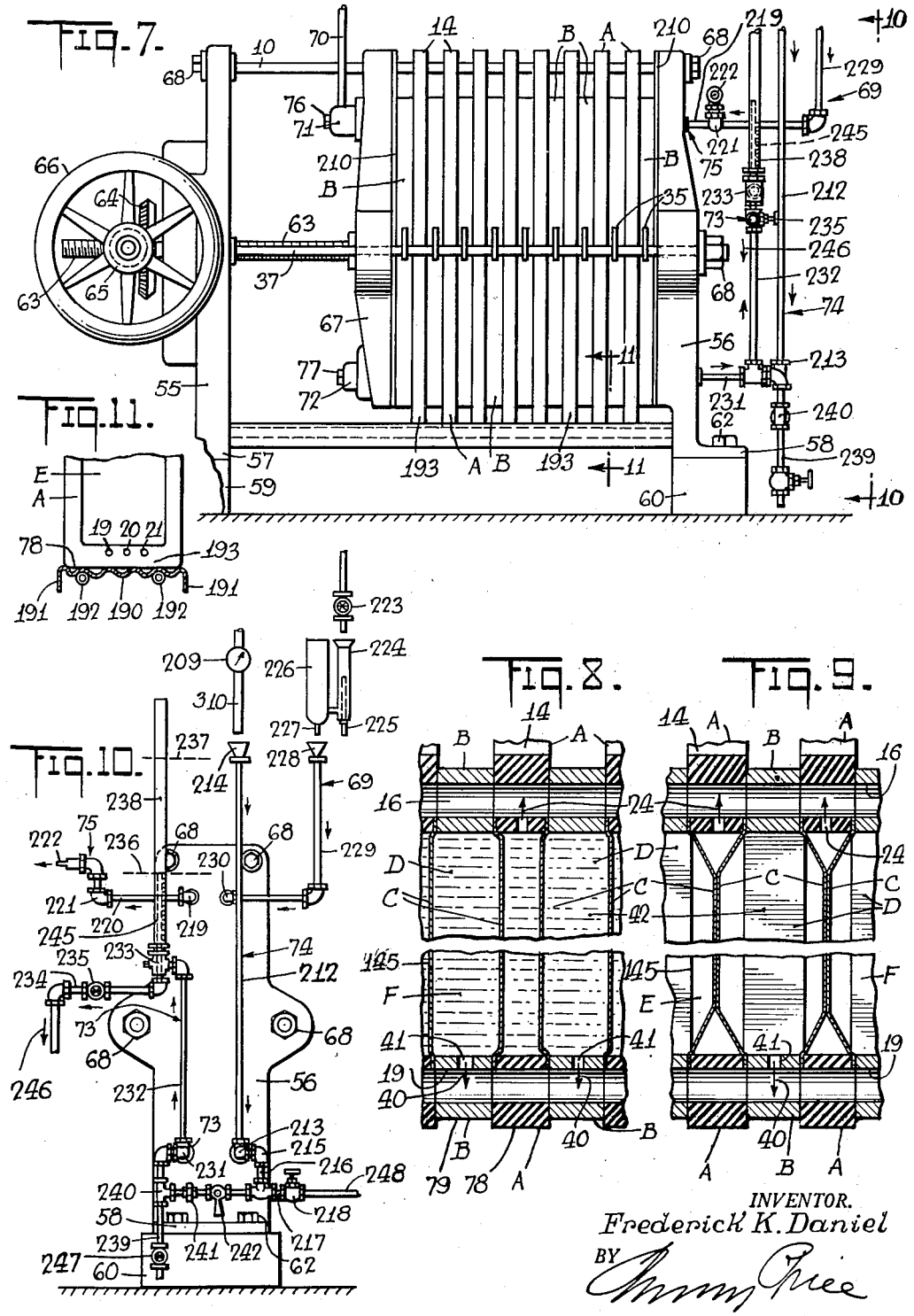
INVENTOR.
Frederick K. Daniel
BY
ATTORNEY Patented Sept. 25, 1951

2,568,990

UNITED STATES PATENT OFFICE 2,568,990

DIALYSIS PROCEDURE

Frederick K. Daniel, Kew Gardens, N. Y.

Application October 2, 1947, Serial No. 777,574

4 Claims. (Cl. 210—8.5)

This invention relates to improvements in the art of dialysis and it relates particularly to a new dialyzing apparatus for continuous dialysis and its application to the treatment of aqueous liquid food products and other materials subject to decomposition or bacterial attack.

Conventional dialyzers consist of a series of alternate frames for the dialyzing liquid (hereinafter referred to as "liquid") and intermediate frames for the solution to be dialyzed (hereinafter referred to as "solution") and semi-permeable membranes, interposed between these frames. Such dialyzers usually require gaskets between frames for liquid tightness, usually a rubber gasket between each frame.

These gaskets may be cemented on to the frames or attached to the frames in some other manner. If the dialyzers are of large construction, for instance if each membrane has a surface area in excess of one square foot, grids are required to keep the membranes from contacting each other, which contact would eliminate most of the effective dialyzing surface.

Conventional dialyzers with grids and gaskets are satisfactory when used for non-perishable fluids, such as caustic-hemicellulose solutions from which the caustic is to be recovered. They are however not acceptable for the treatment of perishable fluids, such as milk or other vegetable or animal fluids.

For one thing, gaskets cemented on the frames are considered unsanitary because some of the solution will lodge itself in the cracks or interstices which inevitably develop in the contact area and it will be almost impossible to clean such interstices with ordinary cleaning procedures. On the other hand, if the gaskets are independent of and separate from the frames, excessive time is consumed in the cleaning and assembling operation. A further disadvantage of separate gaskets and frames resides in the fact that together they form a cell thicker than desirable from the view point of dialyzing efficiency and operational economy.

Furthermore, to clean the separating grids is a difficult and time consuming task, increasing the operating costs. Finally, the construction cost of such dialyzers is high because most meticulous rounding and polishing of all edges and corners is required and no undercuts and dead spaces are permitted.

I have discovered that gaskets in the customary sense of the word may be eliminated and also that separating grids for the membranes may be dispensed with in the solution frames, even if the frames are more than one square foot in area.

I have furthermore discovered that sanitary conditions may be maintained in a dialyzer handling perishable solutions, if the solution frames and the pipes leading thereto and therefrom are of the accepted sanitary design, while the liquid frames are of conventional design with grids fixed to the frame, even though such frames have sharp corners, recesses and undercuts. This fact is based on the observation that the diffusable matter can be removed readily by hot water from any part of the frame or grid where it may lodge, while the reverse is true of the colloidal fraction which is confined to the solution cells.

By conducting the dialysis operation in such a manner that the solution to be dialyzed exercises a pressure against the membranes in excess of that exercised by the dialyzing liquid and by providing the liquid frames with the customary grid supports for the membranes, the need for grid supports in the solution frames is eliminated, permitting the use of unobstructed solution frames. This facilitates the cleaning operation greatly, both in terms of time and cost.

More important, I have discovered that such gridless solution frames can be made of flexible material, such as rubber or synthetic elastomers and according to this invention elastic solution frames are used which also act as gaskets. By the use of such dual purpose solution frames and gaskets, the number of separate frames, grids and gaskets to each dialyzer is cut in half.

While my invention is thus predicated on the ability of maintaining a pressure on the solution cells, it is an important feature of my invention to utilize the absence of grids in the solution cells to great advantage in the recovery of the solution remaining in the dialyzer when the continuous operation is interrupted.

In the conventional dialyzers having grids in both liquid and solution frames, the only possibility for recovering the solution remaining in the dialyzer cells consists in draining it from a bottom outlet. The solution thus recovered is only partly dialyzed. Added to the solution already dialyzed, it reduces the quality of said solution and if added to the supply, it has to go through a full dialysis operation once more. What is of more importance however, is the fact that it will contaminate such supply. By contamination, I mean that bacteria which may have developed during the dialyzing operation will be carried into the fresh supply with the result that the bacterial infection will be perpetuated.

It has, therefore, been necessary in the past either to discard the drainage recovered from the solution cells or to lower the quality of the dialysate.

I have found that by the gridless construction of the solution frames, this problem may be minimized. A fully dialyzed solution may be obtained, recovering almost the entire amount of solution contained in the solution cells at the time of terminating the dialysis operation.

This is accomplished in the following manner. The solution which, during continuous operation, is fed in at the bottom of the solution cells is shut off. The inflow of the dialyzing fluid is maintained at the rate fed during the continuous operation of the dialyzer or is slightly increased. Clamps, valves, or other means are provided to control or restrict the outflow of the dialyzing liquid. The restriction of outflow below inflow causes a slow increase in the volume of dialyzing liquid retained in the liquid cells and increase of pressure in such cells.

The additional volume forces the dialyzing membranes back toward the solution cells, the membranes acting like diaphragms in a diaphragm pump.

If the solution cells are fairly narrow, for example ¼" to ½", the membranes will finally touch and may contact over a major part of the cell area.

While the volume of dialyzing liquid thus increases, it displaces a corresponding volume of solution which is discharged in a steady stream from the top of the dialyzer cells in the same manner in which the normal dialyzate solution is discharged during continuous operation. By control of the displacement rate, the quality of the dialyzate is regulated. It can easily be made to equal the quality of the dialyzate obtained during the preceding continuous inflow operation.

The invention also consists in certain new and original features of construction and combination of parts hereinafter set forth and claimed and as to its other objects, features and advantages, the mode of operation and manner of its organization, these, inter alia, may be better understood by referring to the following description considered in connection with the accompanying drawings forming a part thereof in which:

Fig. 1 is a front elevational view of a dialysis frame to form the chamber to receive the solution to be dialyzed;

Fig. 2 is a transverse sectional view upon the line 2—2 of Fig. 1 of said frame;

Fig. 3 is a front elevational view of a frame for dialysis apparatus designed to form the chamber for the dialyzing liquid;

Fig. 4 is a vertical transverse sectional view upon the line 4—4 of Fig. 3;

Fig. 5 is a fragmentary transverse vertical sectional view upon the line 5—5 of Fig. 1 and upon an enlarged scale as compared to Fig. 1;

Fig. 6 is a vertical transverse sectional view of a portion of the frame for the chamber of the solution being dialyzed upon the line 6—6 of Fig. 5;

Fig. 7 is a diagrammatic side elevational view of the solution and liquid frames clamped together to form a complete dialyzing apparatus;

Fig. 8 is a detailed vertical fragmentary transverse sectional view showing the construction of the cells with grids in the liquid chambers or cells and without grids in the solution chambers or cell during normal dialysis operations, Fig. 9 is a fragmentary vertical sectional view similar to Fig. 8 showing the expansion of the diaphragms into the chambers or cells for the solution being dialyzed when such chambers or cells are being emptied, Fig. 10 is an end diagrammatic elevational view taken from the line 10—10 of Fig. 7 showing the liquid connections, and Fig. 11 is a detail fragmentary cross sectional view upon the line 11—11 of Fig. 7.

Referring to Figs. 1, 2, 5 and 6, the frame A forms the cell or chamber E for the solution to be dialyzed and it may be made of synthetic or natural rubber or other elastomeric resilient materials.

Referring to Figs. 3 and 4 the frames B forming the chambers F may be formed of steel, aluminum, stainless metal, magnesium or other relatively rigid materials.

Between the frames A and B are clamped the semi-permeable membranes C which may be of cellophane or of regenerated cellulose, or which may also be made of parchment or other membrane materials. Within the liquid frames B are located the grid structures D which are omitted from the chambers E to receive the solution being dialyzed.

Referring to Figs. 1, 2, 5 and 6, the frame A forming the chamber E for the solution to be dialyzed may be of molded rubber, as indicated with slightly rounded vertical inside edges 11 and horizontal edges at 12 and rounded corners 13. The top of the frame has the upwardly projecting suspension ears 14 having openings 15 to receive support rods 10 upon which the frames A may be suspended. At the top and bottom of the frame are the passageways 16, 17, 18, 19, 20 and 21. The solution to be dialyzed will flow through the passageway 20 then up in the bore 29 into the chamber E as indicated by the arrow 22.

After dialysis, the dialyzed solution will flow out through the passageway 23 as indicated by the arrow 24 into the longitudinal passageway 16 extending longitudinally through the frames A and B. The cellophane membrane C may extend as indicated at 25 slightly beyond the sides 26 of the frame A, but its upper edge should terminate at 27 and its lower edge at 28, so as not to cover the through passageways 16, 17, 18, 19, 20 and 21.

The rigid frame B which may be made of aluminum, magnesium, stainless steel, Monel metal or rigid or laminated plastic, has the outwardly extending bracket members 35, the lower portions of which have recesses 36 which fit onto the support tubes or rods 37. Through the upper and lower portions of these frames B pass the conduits 16, 17, 18, 19, 20 and 21 communicating with the correspondingly numbered conduits in the frames A. The liquid or water will flow through the conduit 17 and then out through the passageway 38 into the top of the chamber F as indicated by the arrow 39. It will then flow out of the bottom of the chamber F as indicated by the arrow 40 through the passageway 41 into the longitudinal conduit 19.

The passageways 18 and 21 extend entirely through the frames A and B. At their left end of Fig. 7, passageways 18 and 21 open into the detachable return blocks 71 and 72 which are mounted on the plate 67 by the bolts 76 and 77. These return blocks 71 and 72 are provided for the purpose of permitting all liquid connections to be made at one end of the assembled dialysis frames A and B. All connections are made at the right end as shown in Fig. 7.

The rubber or gasket frames A extend at their lower ends 78 below the lower ends 79 of the metal frames B as indicated at 193 in Fig. 7, for example, by ¼" to ⅜".

Within the chambers F are positioned the grid structures D which consist of a series of vertical, elongated plates 42 extending substantially the full height of the chamber. At their upper and lower ends 44 they are welded to the top and bottom of the frames F and they project a slight distance about a $\frac{1}{32}$" to $\frac{1}{16}$" on each side of the frames B as indicated at 145. The upper and lower ends of the plates 42 may also be positioned in slots in the frames B (not shown).

The plates 42 are held apart and in proper position by the transverse rods 45 which at their ends 46 are fitted into the sides 47 of the frames B. The rods 45 have deformed portions 48 which fix the plates 42 in position.

When the frames are assembled together as indicated at Fig. 7, there will be two end stands 55 and 56 having the bottom flanges 57 and 58 supported on the base blocks 59 and 60 by bolts 62.

Between these end stands 55 and 56 extend the rods or pipes 10 for supporting or suspending the frames A as well as the parallel rods or tubes 37 for supporting the frames B. The upright member 55 carries the screw element 63 which may be actuated by the bevel gear 64, operated by means of the intermeshing bevel gear 65. The bevel gear 65 is operated by the hand wheel 66. Operation of the hand wheel 66 through the screw 63 serves to actuate the clamping plate 67 to compress the stack of frames A and B, against the upright member 56.

At the end plates 56 and 67, the rubber gaskets 210 are provided for sealing end metal frames A. The gaskets 210 may be attached with screws to the end plates 56 and 67 and may be composed of rubber of a hardness equal to that of the frames B or they may be of softer rubber.

The rods or pipes 10 and 37 may be held in position by the nuts 68. The liquid connection for the incoming liquid is made by the conduit system 69 while the outlet connection is made by the conduit system 73. The inlet solution connection is made by the conduit system 74, while the outlet connection is made by the conduit system 75. The standpipe 70 extending upwardly from the return block 71 serves as a vent.

In Fig. 10 the solution, for example, skim milk, is being fed through the conduit system 74. It flows from the metering pump 209 through pipe 310, the funnel 214 and the pipe 212 to the inlet connection 213.

The dialyzed milk during normal operation flows in the conduit system 75 from the outlet connection 219, through pipe 220 and elbow 221 to nipple 222 located at or slightly above operating water level 236.

The water flows in the conduit system 69 past valve 223 into receptacle 224 having overflow 225. From receptacle 224 it flows into receptacle 226 and then by nipple 227 into funnel 228 and pipe 229 to inlet connection 230.

The water flows out in the conduit system 73 past the connection 231 through pipe 232, junction 233, up through the lower part of standpipe 238 and then down through overflow pipe 245 inside said standpipe 238. Then it flows past regulating valve 235 through pipe 234 to discharge as indicated by arrow 246. By the valve 235 it is possible to regulate the head from the normal operating level indicated at 236 in the standpipe 238 up to maximum head at 237 which is reached when the membranes have maximum contact.

When the operation of the dialyzer is started, both cells E and F are filled with water which is admitted through pipe 239 past valve 247. Part of the water goes through fitting 240 to the connection 231 to water cells F and the other part goes from junction 240 past union 241 and the temporarily opened valve 242 through connections 216, 215 and 213 into the solution cells E.

When the dialyzer is completely filled, valves 242 and 247 are closed and the solution fed through the system 74. The solution will then displace the water in cells E without substantial mixing.

For draining the solution from cells E, the valve 218 may be opened. For draining both cells E and F, both valves 218 and 242 are opened to discharge through pipe 248.

Referring to Fig. 8, when the dialysis procedure is being carried on the solution, such as skim milk, will flow in the cells E and will exercise somewhat more pressure upon the membranes C than the liquid in the alternating cells F.

During operation, the operating water level 236 is kept about ½" to 1" below the level of nozzle 222 and this difference in level plus the difference in specific gravity of the milk and water will give the desired difference in head causing membranes closely to contact the grids in the water cells.

As a result as shown in Fig. 8, the diaphragms C will contact and press against the edges 145 of the vertical grid plates 42. When, however, the apparatus is to be closed down, and cleaned, the pressure in the liquid cells F is increased relative to the pressure in the solution cells E until the membranes C bulge toward each other substantially evacuating or forcing the liquid out of the solution chambers E (see Fig. 9).

During emptying of the milk cells, the valve 235 is partly closed to build up back pressure substantially to maintain the milk discharge past nozzle 222 after the milk supply through pipe 214 has been cut off. The gradual increase will continue until the diaphragms or semipermeable membranes touch.

To give a specific example, a dialyzer consisting of 21 liquid frames B, 9" x 28" inside dimensions and 20 solution frames A of the same dimensions is assembled in such fashion that the odd numbered liquid cells F alternate with the even numbered solution cells E.

The liquid frame F may be ⅝" in thickness and may have grids spaced 1¼" apart in parallel vertical position. The grids D may be $\frac{1}{16}$" to ⅛" thick and ¾" wide, protruding $\frac{1}{16}$" on each side over the face of the liquid frames B.

The frames A may be ⅜" thick and consist of an elastomer of medium hardness, say 60 durometer reading. The solution frames A are supported on top by 2 bars 10 and may be supported at their bottoms by a corrugated metal plate 190 with the side flanges 191. The plate 190 is carried by the longitudinal support tubes 192. The liquid frames are supported by stanchions 37 on each side. The parchment or cellophane membranes C are interposed between the cells by first wetting them and then letting them touch the liquid frames B, one membrane C to each side of the liquid frame B. When the 40 membranes C are placed in position, the dialyzer is clamped together and is ready to operate. The exposed membrane area in this case is 10,000 square inches.

The liquid frames B and the grids D may be made of a metal, such as steel, stainless steel, Monel metal, aluminum alloys, anodized aluminum alloys or plastic or laminated plastics.

The solution frames A may consist of any elastomer able to withstand the chemical action of the liquids brought in contact with them. Compounded natural or synthetic rubbers are satisfactory, provided they do not display pronounced cold flow or permanent set. All corners of these solution frames are rounded for cleaning convenience.

The material to be dialyzed, such as protein solutions containing non-colloidal components which it is desired to remove, skim milk or whey being exemplary, are fed into the solution cells E, entering the dialyzer from the bottom at 21 and flowing upward in parallel through all solution cells E. The dialyzing liquid, usually water, enters the liquid cells at the top at 38 flowing downward in parallel through all the liquid cells F.

In one particular example, concentrated skim milk is dialyzed through the 41 frame dialyzer of 10,000 sq. inch surface at the rate of one gallon per hour of milk inflow and 3 to 6 gallons of water inflow per hour. The volume of liquid held by the liquid cells is 16½ gallons while the volume of solution contained in the solution cells is 6 gallons.

A hydrostatic head is maintained on the liquid cells F by an adjustable header tube at the outlet for the liquid as best shown in Fig. 10. The height of the solution outflow tube may be 3" above the top of the dialyzer frames B while the height of the liquid outflow tube is adjusted about ¼" to ½" below that of the solution outflow tube, for example, 2½" to 2¾" above the dialyzer frames. Since the concentrated skim milk of this example has a specific gravity of about 1.12 to 1.13 which, during dialysis, is reduced to a specific gravity of 1.04 to 1.05, while the specific gravity of the water increases to between 1.005 and 1.015, it is obvious that the weight of the solution in the solution cells E is greater than the weight of the dialyzing liquid at any point of the dialyzer.

Added to this, is the extra hydrostatic head of ¼" to ½" which is maintained on the solution cells E. Both factors together assure a positive pressure to be exercised by the solution against the liquid with the result that the membranes C are pressed against the grids D of the liquid frames B assuring full utilization of the membrane surface.

It is to be understood that the differential in hydrostatic head should be kept near the minimum required to assure the membranes to rest against the grids D. In no case should a pressure in excess of about 2 lbs. per sq. inch be exerted on any part of the membranes C. Either hydrostatic head or specific gravity alone or both together may be utilized for maintaining the pressure, and in extreme cases, the hydrostatic head of the water may even be higher than that of the solution.

Both concentrated milk and water are fed in continuous stream into the dialyzer at the above-mentioned rates. The dialyzed solution and the dialyzing liquid leave the dialyzer in a continuous stream at rates slightly different from those at which they enter, due to the effect of endosmosis.

It is desirable to maintain a continuous operation of the dialyzer for as long a period as is possible, keeping in mind the necessity for sanitary operation in cases where no bactericidal agent is added to the milk.

When the bacterial count shows signs of getting too high or experience shows that the operating cycle should be ended soon, the milk inflow is discontinued. The inflow of water, however, is maintained. Only, instead of letting the dialyzing liquid leave the dialyzer in an unimpeded stream, as during continuous operation, a flow restrictive device, such as a valve or nozzle is put on the liquid outflow pipe. If the liquid outflow during continuous operation was, say 300 c. c. per minute and the solution outflow was 100 c. c. per minute, the flow restriction device should reduce the amount of liquid outflow by about 100 c. c. per minute. The 100 c. c. per minute held back in the dialyzer will force a corresponding amount, namely, 100 c. c. of the solution, out of the solution cells E.

Thus, the dialysis operation is continued effectively at about the same rate as before, even though no fresh solution is fed to the dialyzer. This will go on until the membranes touch and all except a negligible amount of the solution has been recovered from the solution cells. When the membranes touch, the back pressure in the liquid cells will rise quickly and at that point the water inflow is shut off. Less than a gallon of solution is left in the dialyzer at this point and this material is partly dialyzed. It may be discarded or added to the dialyzed solution without either lowering the quality of the dialyzate materially or causing a serious loss of material.

Instead of maintaining the solution outflow at the same rate at which it was leaving the dialyzer during continuous operation, the solution may be displaced at a higher or a lower rate. This can be done by varying the setting of the restricting device. It may also be desirable to increase the water inflow say from 350 to 450 c. c. per minute at the time that the overflow is restricted so that the outflow rate of the water may be maintained at the same rate at which it is leaving the dialyzer during continuous operation, for example, about 300 c. c. per minute.

The present dialysis procedures are particularly applicable to dialysis of solutions or organic liquids, such as whole milk, skimmed milk, whey, soya bean milk, serums, molasses, sugar syrups, distillery slops, corn steeping liquors, toxins, blood, and various other food, pharmaceuticals and waste organic liquids.

It is generally applicable to dialysis apparatus where the diaphragm areas are substantially greater than one square foot across sectional area and where the flexible frames for the solution are suspended, while the rigid frames for the liquid are supported at their sides.

As many changes could be made in the above procedures and apparatus for dialysis and many widely different embodiments of this invention could be made without departing from the scope of the claims, it is intended that all matter contained in the above description or shown in the accompanying drawings shall be interpreted as illustrative and not in a limiting sense.

Having now particularly described and ascertained the nature of the invention and in what manner the same is to be performed, what is claimed is:

1. A method of operating a dialysis apparatus having alternating rigid and elastic frames forming chambers separated by semi-permeable membranes, said chambers alternately carrying a downwardly flowing dialyzing liquid and an upwardly flowing solution to be dialyzed, which comprises recovering fully dialyzed solution from the solution chambers when the solution inflow is discontinued by gradually expanding the semipermeable membranes into said solution chambers.

2. A method of discharging a dialysis apparatus having alternating rigid and elastic frames forming chambers separated by semi-permeable membranes, said chambers alternately carrying a downwardly flowing dialyzing liquid and an upwardly flowing solution to be dialyzed, which comprises emptying the alternating solution chambers by increasing the pressure within the liquid chambers to cause the membranes to expand into the solution chambers and eventually contact over a major part of the area of the chambers and expel the solution being dialyzed.

3. A process of operating a dialysis apparatus having alternating rigid and elastic frames forming chambers separated by semi-permeable membranes, said chambers alternately carrying a downwardly flowing dialyzing liquid and an upwardly flowing solution to be dialyzed, applying a higher pressure to solution cells during dialysis to bias the membranes toward the liquid cells and reversing the pressure to empty the solution cells when the dialysis is discontinued, said reversed pressure being so applied as to empty the solution cells at about the same rate as they normally discharged the dialyzed solution.

4. A process of dialyzing liquid skim milk which is enclosed in a relatively flat rectangular chamber between semi-permeable membranes, which comprises periodically displacing the milk by causing the membranes to expand into the chamber and contact each other.

FREDERICK K. DANIEL.

REFERENCES CITED

The following references are of record in the file of this patent:

UNITED STATES PATENTS

| Number | Name | Date |
|---|---|---|
| 2,107,805 | Russell | Feb. 8, 1938 |
| 2,247,143 | Bailey | June 24, 1941 |
| 2,312,015 | Weber | Feb. 23, 1943 |
| 2,365,457 | Daniel | Dec. 19, 1944 |
| 2,390,628 | Van Winkle | Dec. 11, 1945 |

OTHER REFERENCES

Chemical and Metallurgical Engineering, November 1929, p. 189.